US012659105B2

(12) United States Patent
Wang et al.

(10) Patent No.: US 12,659,105 B2
(45) Date of Patent: Jun. 16, 2026

(54) RESOURCE DETERMINATION METHOD, COMMUNICATION DEVICE AND STORAGE MEDIUM

(71) Applicant: DATANG MOBILE COMMUNICATIONS EQUIPMENT CO., LTD., Beijing (CN)

(72) Inventors: Jiaqing Wang, Beijing (CN); Meiying Yang, Beijing (CN); Yuwan Su, Beijing (CN); Fangchen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 345 days.

(21) Appl. No.: 18/261,650

(22) PCT Filed: Jan. 10, 2022

(86) PCT No.: PCT/CN2022/070940
§ 371 (c)(1),
(2) Date: Jul. 14, 2023

(87) PCT Pub. No.: WO2022/152068
PCT Pub. Date: Jul. 21, 2022

(65) Prior Publication Data
US 2024/0089053 A1      Mar. 14, 2024

(30) Foreign Application Priority Data

Jan. 15, 2021   (CN) .......................... 202110055686.4
Apr. 2, 2021   (CN) .......................... 202110360896.4

(51) Int. Cl.
*H04L 5/00* (2006.01)
(52) U.S. Cl.
CPC ............ *H04L 5/005* (2013.01); *H04L 5/0091* (2013.01)

(58) Field of Classification Search
None
See application file for complete search history.

(56) References Cited

U.S. PATENT DOCUMENTS

2020/0187176 A1      6/2020   Chai et al.
2021/0368444 A1      11/2021   Wang et al.
(Continued)

FOREIGN PATENT DOCUMENTS

CN        109309950   A      2/2019
CN        109495925   A      3/2019
(Continued)

OTHER PUBLICATIONS

International Search Report for PCT Application No. PCT/CN2022/070940 issued on Apr. 6, 2022 and its English Translation provided by WIPO.
(Continued)

*Primary Examiner* — Walter J Divito
(74) *Attorney, Agent, or Firm* — Ladas & Parry, LLP

(57) ABSTRACT

A resource determination method, a communication device, and a storage medium are provided. The resource determination method includes: determining, by the communication device, a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

20 Claims, 4 Drawing Sheets

(56) References Cited

U.S. PATENT DOCUMENTS

| | | |
|---|---|---|
| 2022/0094505 A1 | 3/2022 | He et al. |
| 2023/0083399 A1 | 3/2023 | Wang et al. |

FOREIGN PATENT DOCUMENTS

| | | |
|---|---|---|
| CN | 109842937 A | 6/2019 |
| CN | 110831123 A | 2/2020 |
| CN | 111436126 A | 7/2020 |
| CN | 113259071 A | 8/2021 |
| WO | 2020096852 A1 | 5/2020 |

OTHER PUBLICATIONS

Written Opinion for PCT Application No. PCT/CN2022/070940 issued on Apr. 6, 2022 and its English Translation provided by WIPO.

International Preliminary Report on Patentability for PCT Application No. PCT/CN2022/070940 issued on Jul. 4, 2023 and its English Translation provided by WIPO.

"Discussion on potential TRS/CSI-RS," 3GPP TSG-RAN WG2 Meeting #115 electronic, R2-2108030, Online, Aug. 9-Aug. 27, 2021, Agenda Item: 8.9.3, Source: Huawei, HiSilicon.

First Office Action and search report for Chinese Patent Application No. 202110360896.4 issued by the Chinese Patent Office on Jul. 20, 2023 and its English translation provided by the foreign associate.

"Moderator summary for TRS/CSI-RS occasion(s) for idle/inactive UEs," R1-2008178, e-Meeting, Oct. 26-Nov. 13, 2020, Agenda Item: 8.7.1.2, Source: Moderator (Samsung).

Extended European Search Report for European Patent Application No. 22738949.1 issued by the European Patent Office on May 31, 2024.

"On RS information to Idle/Inactive mode UEs," 3GPP TSG RAN WG1 #103-e, R1-2008934, e-Meeting, Oct. 26-Nov. 13, 2020, Agenda Item: 8.7.1.2, Source: Nokia, Nokia Shanghai Bell.

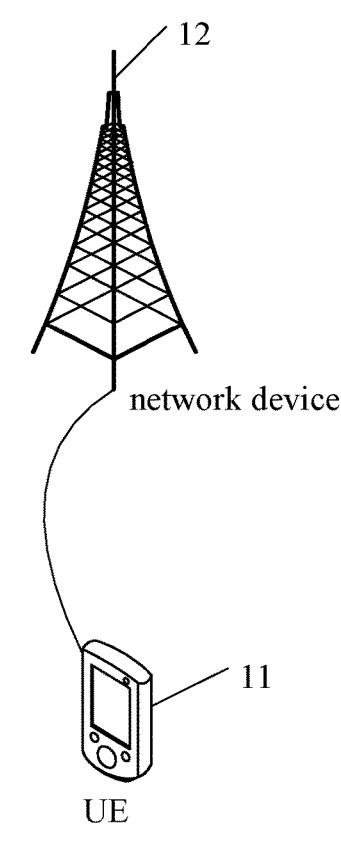
network device
UE
Fig. 1
determining, by a communication device, a first resource in accordance with information content, the first resource being a transmission resource for a reference signal
201
Fig. 2
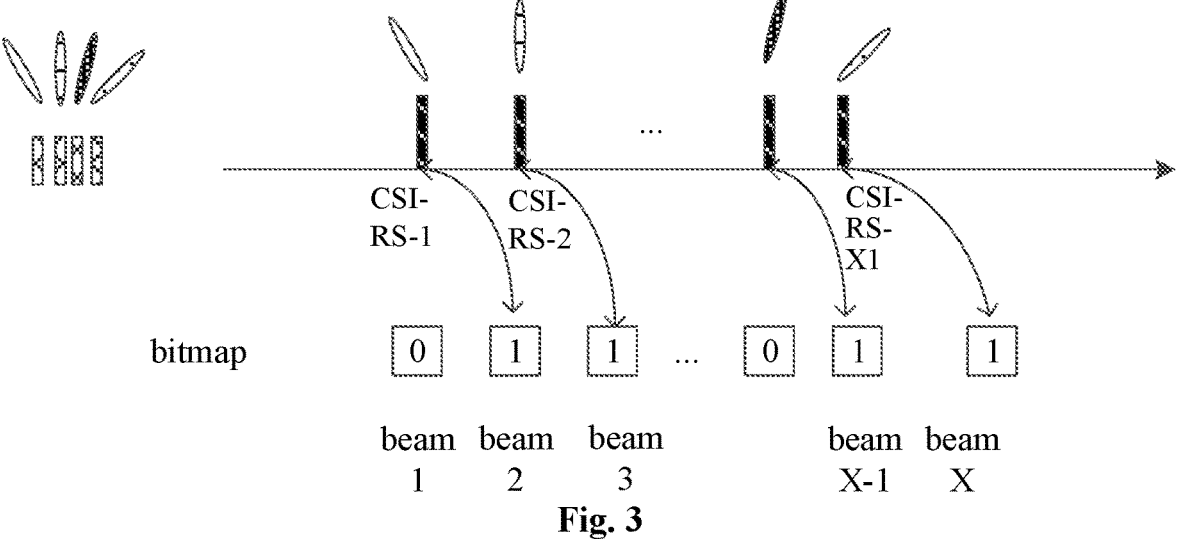
Fig. 3 beam-1      beam-2                    beam-X

CSI-        CSI-                      CSI-
RS-1        RS-2                      RS-X bitmap      [1]    [0]        [1]    [0]

transmitting CSI-RS      not transmitting CSI-RS

SIBx

CSI-        CSI-                      CSI-RS-X1
RS-1        RS-2 beam 1   beam 2   beam 3  ···   beam X-1      beam X

SSB1      SSB 2      SSB 3      SSB 4      SSB5

CSI-RS resource set-1      CSI-RS resource set-3

RESOURCE DETERMINATION METHOD, COMMUNICATION DEVICE AND STORAGE MEDIUM

CROSS-REFERENCE TO RELATED APPLICATIONS

This application is the U.S. national phase of PCT Application No. PCT/CN2022/070940 filed on Jan. 10, 2022, which claims the priorities of to the Chinese patent application No. 202110055686.4 filed in China on Jan. 15, 2021 and the Chinese patent application No. 202110360896.4 filed in China on Apr. 2, 2021, the disclosures of which are incorporated herein by reference in their entities.

TECHNICAL FIELD

The present disclosure relates to the field of communication technology, in particular to a resource determination method, a communication device a storage medium.

BACKGROUND

In some communication systems, a reference signal is mainly configured through Radio Resource Control (RRC) signaling. However, the RRC signaling is signaling for transmission when a User Equipment (UE) is in a connected state, so the UE merely determines a position for transmitting a signal when the UE is in the connected state, or a network device merely determines the position for transmitting the signal when an RRC connection is established with the UE, resulting in high power consumption of communication devices such as the UE and the network device.

SUMMARY

An object of the present disclosure is to provide a resource determination method, a communication device and a storage medium, so as to reduce the power consumption of the communication device.

In one aspect, the present disclosure provides in some embodiments a resource determination method, including determining, by a communication device, a first resource in accordance with information content. The first resource is a transmission resource for a reference signal. The information content includes at least one of configuration content pre-agreed by a network side with a UE, configuration content obtained by the UE through System Information (SI) signaling, configuration content obtained by the UE through Physical Downlink Control Channel (PDCCH) signaling, or a predefined rule. The communication device is the UE or a network device.

Optionally, the reference signal includes one of a Tracking Reference Signal (TRS), a Channel-State-Information Reference Signal (CSI-RS) or a Paging Early Indication (PEI).

Optionally, the determining the first resource includes determining a first period of the first resource.

Optionally, the first period is a function of a paging period, or the first period is a function of the paging period and the quantity of paging frames within the paging period, or the first period is a function of a Synchronization Signal Block (SSB) period.

Optionally, in the case that the first period is the function of the paging period, the quantity of first resources within the first period corresponds to the quantity of Paging Occasions (POs) of the paging frame.

Optionally, the first period is pre-agreed by the network side with the UE, or at least one candidate period is pre-agreed by the network side with the UE and the first period is determined in the at least one candidate period through the SI signaling, or the first period is determined in accordance with a predefined rule.

Optionally, the resource determination method further includes determining, by the communication device, a common time-domain offset value of the first resource corresponding to a plurality of POs within a target paging frame in accordance with the SI signaling, or determining, by the communication device, at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

Optionally, the resource position includes at least one of a start position of the first resource or an end position of the first resource, or the resource position is used to indicate that the start position of the first resource is after the resource position or the end position of the first resource is before the resource position.

Optionally, the resource determination method further includes determining, by the communication device, a time-domain offset value of the first resource within the first period in accordance with the SI signaling, and the time-domain offset value is an offset value of the first resource relative to the target paging frame, or the time-domain offset value is an offset value of the first resource relative to an SSB.

Optionally, the determining the first resource includes determining a resource position of the first resource.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter.

Optionally, the time-domain parameter includes at least one of a time-domain offset value of the first resource, a relevant parameter of the paging period, or a relevant parameter of the paging frame. The predefined rule is used to indicate that the resource position of the first resource is associated with at least one of an identity of the UE, the time-domain offset value of the first resource, the relevant parameter of the paging period or the relevant parameter of the paging frame.

Optionally, the determining the first resource includes: determining a transmission beam of the first resource; or determining the first resource for at least one beam.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

Optionally, the determining the first resource for at least one beam includes determining the first resource for the at least one beam in accordance with the SI signaling, wherein the SI signaling is used to indicate the first resource for the at least one beam.

Optionally, the SI signaling is used to indicate the first resource for the at least one beam through a correspondence between a Transmission Configuration Indication (TCI) state of the first resource for the at least one beam and an SSB.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

Optionally, the determining the first resource includes determining a frequency-domain position of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a Control Resource Set (CORESET) or an initial Bandwidth Part (BWP).

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

Optionally, the determining, in accordance with the PDCCH signaling and the predefined rule, the first resource updated through the PDCCH signaling includes determining that the first resource updated through the PDCCH signaling is valid at a target time after the reception of the PDCCH signaling, and the target time is defined in the predefined rule.

Optionally, the determining the first resource includes determining a TCI state of the first resource.

Optionally, the first resource is a first resource set.

Optionally, the TCI state of the first resource is same as a TCI state of a transmitted SSB, or the first resource is associated with the transmitted SSB.

Optionally, an index of the first resource is associated with an identity of the SSB, and the index of the first resource is an index indicated explicitly or implicitly.

Optionally, indices of a plurality of first resources are sequenced in accordance with an order of the corresponding SSBs.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

In another aspect, the present disclosure provides in some embodiments a communication device, including a memory, a transceiver and a processor. The memory is configured to store therein a computer program. The transceiver is configured to transmit and receive data under the control of the processor. The processor is configured to read the computer program in the memory to determine a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

Optionally, the determining the first resource includes determining a first period of the first resource.

Optionally, the first period is a function of a paging period, or the first period is a function of the paging period and the quantity of paging frames within the paging period, or the first period is a function of an SSB period.

Optionally, in the case that the first period is the function of the paging period, the quantity of first resources within the first period corresponds to the quantity of POs of the paging frame.

Optionally, the first period is pre-agreed by the network side with the UE, or at least one candidate period is pre-agreed by the network side with the UE and the first period is determined in the at least one candidate period through the SI signaling, or the first period is determined in accordance with a predefined rule.

Optionally, the processor is further configured to determine a common time-domain offset value of the first resource corresponding to a plurality of POs within a target paging frame in accordance with the SI signaling, or determine at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

Optionally, the resource position includes at least one of a start position of the first resource or an end position of the first resource, or the resource position is used to indicate that the start position of the first resource is after the resource position or the end position of the first resource is before the resource position.

Optionally, the processor is further configured to determine a time-domain offset value of the first resource within the first period in accordance with the SI signaling, and the time-domain offset value is an offset value of the first resource relative to the target paging frame, or the time-domain offset value is an offset value of the first resource relative to an SSB.

Optionally, the determining the first resource includes determining a resource position of the first resource.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter.

Optionally, the time-domain parameter includes at least one of a time-domain offset value of the first resource, a relevant parameter of the paging period, or a relevant parameter of the paging frame. The predefined rule is used to indicate that the resource position of the first resource is associated with at least one of an identity of the UE, the time-domain offset value of the first resource, the relevant parameter of the paging period or the relevant parameter of the paging frame.

Optionally, the determining the first resource includes: determining a transmission beam of the first resource; or determining the first resource for at least one beam.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

Optionally, the determining the first resource for at least one beam includes determining the first resource for the at least one beam in accordance with the SI signaling, wherein the SI signaling is used to indicate the first resource for the at least one beam.

Optionally, the SI signaling is used to indicate the first resource for the at least one beam through a correspondence between a TCI state of the first resource for the at least one beam and an SSB.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

Optionally, the determining the first resource includes determining a frequency-domain position of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a CORESET or an initial BWP.

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

Optionally, the determining, in accordance with the PDCCH signaling and the predefined rule, the first resource updated through the PDCCH signaling includes determining that the first resource updated through the PDCCH signaling is valid at a target time after the reception of the PDCCH signaling, and the target time is defined in the predefined rule.

Optionally, the reference signal includes one of a TRS, a CSI-RS or a PEI.

Optionally, the determining the first resource includes determining a TCI state of the first resource.

Optionally, the first resource is a first resource set.

Optionally, the TCI state of the first resource is same as a TCI state of a transmitted SSB, or the first resource is associated with the transmitted SSB.

Optionally, an index of the first resource is associated with an identity of the SSB, and the index of the first resource is an index indicated explicitly or implicitly.

Optionally, indices of a plurality of first resources are sequenced in accordance with an order of the corresponding SSBs.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

In yet another aspect, the present disclosure provides in some embodiments a communication device, including a determination unit configured to determine a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

Optionally, the determining the first resource includes determining a first period of the first resource.

Optionally, the first period is a function of a paging period, or the first period is a function of the paging period and the quantity of paging frames within the paging period, or the first period is a function of an SSB period.

Optionally, in the case that the first period is the function of the paging period, the quantity of first resources within the first period corresponds to the quantity of POs of the paging frame.

Optionally, the first period is pre-agreed by the network side with the UE, or at least one candidate period is pre-agreed by the network side with the UE and the first period is determined in the at least one candidate period through the SI signaling, or the first period is determined in accordance with a predefined rule.

Optionally, the communication device further includes a second determination unit configured to determine a common time-domain offset value of the first resource corresponding to a plurality of POs within a target paging frame in accordance with the SI signaling, or determine at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

Optionally, the resource position includes at least one of a start position of the first resource or an end position of the first resource, or the resource position is used to indicate that the start position of the first resource is after the resource position or the end position of the first resource is before the resource position.

Optionally, the communication device further includes a third determination unit configured to determine a time-domain offset value of the first resource within the first period in accordance with the SI signaling, and the time-domain offset value is an offset value of the first resource relative to the target paging frame, or the time-domain offset value is an offset value of the first resource relative to an SSB.

Optionally, the determining the first resource includes determining a resource position of the first resource.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter.

Optionally, the time-domain parameter includes at least one of a time-domain offset value of the first resource, a relevant parameter of the paging period, or a relevant parameter of the paging frame. The predefined rule is used to indicate that the resource position of the first resource is associated with at least one of an identity of the UE, the time-domain offset value of the first resource, the relevant parameter of the paging period or the relevant parameter of the paging frame.

Optionally, the determining the first resource includes: determining a transmission beam of the first resource; or determining the first resource for at least one beam.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

Optionally, the determining the first resource for at least one beam includes determining the first resource for the at least one beam in accordance with the SI signaling, wherein the SI signaling is used to indicate the first resource for the at least one beam.

Optionally, the SI signaling is used to indicate the first resource for the at least one beam through a correspondence between a TCI state of the first resource for the at least one beam and an SSB.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

Optionally, the determining the first resource includes determining a frequency-domain position of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a CORESET or an initial BWP.

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

Optionally, the determining, in accordance with the PDCCH signaling and the predefined rule, the first resource updated through the PDCCH signaling includes determining that the first resource updated through the PDCCH signaling is valid at a target time after the reception of the PDCCH signaling, and the target time is defined in the predefined rule.

Optionally, the reference signal includes one of a TRS, a CSI-RS or a PEI.

Optionally, the determining the first resource includes determining a TCI state of the first resource.

Optionally, the first resource is a first resource set.

Optionally, the TCI state of the first resource is same as a TCI state of a transmitted SSB, or the first resource is associated with the transmitted SSB.

Optionally, an index of the first resource is associated with an identity of the SSB, and the index of the first resource is an index indicated explicitly or implicitly.

Optionally, indices of a plurality of first resources are sequenced in accordance with an order of the corresponding SSBs.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

In still yet another aspect, the present disclosure provides in some embodiments a processor-readable storage medium storing therein a computer program. The computer program is used to be executed by a processor to implement the above-mentioned resource determination method.

According to the embodiments of the present disclosure, the communication device determines the first resource in accordance with the information content. The first resource is a transmission resource for the reference signal. The information content includes at least one of the configuration content pre-agreed by the network side with the UE, the configuration content obtained by the UE through SI signaling, the configuration content obtained by the UE through PDCCH signaling, or the predefined rule. The communication device is the UE or the network device. As a result, it is unnecessary to determine a transmission position of the reference signal in accordance with RRC signaling, so it is able to reduce the power consumption of the communication device.

BRIEF DESCRIPTION OF THE DRAWINGS

FIG. 1 is a schematic view showing applicable network architecture according to an embodiment of the present disclosure;

FIG. 2 is a flow chart of a resource determination method according to an embodiment of the present disclosure;

FIG. 3 is a schematic view showing a first resource according to an embodiment of the present disclosure;

DETAILED DESCRIPTION

Figure 4:
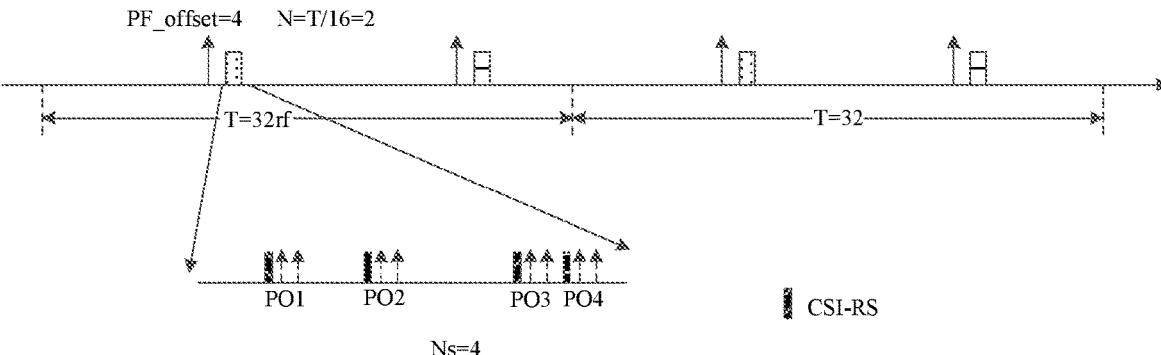
FIG. 4 is another schematic view showing the first resource according to an embodiment of the present disclosure.

In order to make the objects, the technical solutions and the advantages of the present disclosure more apparent, the present disclosure will be described hereinafter in conjunction with the drawings and embodiments.

The expression "and/or" in the embodiments of the present disclosure may be merely used to describe the relationship between objects, and it may include three relationships. For example, "A and/or B" may represent that, there is only A, there are both A and B, and there is only B. Further, the symbol "/" usually refers to "or".

The expression "a plurality of" refers to two or more, and the other quantifiers are similar.

In the following, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a resource determination method, a communication device and a storage medium, so as to reduce the power consumption of the communication device.

The method and the device are provided on the basis of a same inventive concept, and a principle of the method for solving the problem is similar to that of the device, so the implementation of the device may refer to that of the method.

Schemes in the embodiments of the present disclosure may be applied to various systems, especially a 6G system, e.g., Global System of Mobile communication (GSM), Code Division Multiple Access (CDMA) system, Wideband Code Division Multiple Access (WCDMA) system, General Packet Radio Service (GPRS) system, Long Term Evolution (LTE) system, LTE Frequency Division Duplexing (FDD) system, LTE Time Division Duplexing (TDD) system, Long Term Evolution Advanced (LTE-A) system, Universal Mobile Telecommunication System (UMTS), Worldwide Interoperability for Microwave Access (WiMAX) system, $5^{th}$-Generation (5G) New Radio (NR) system, or the 6G system. Each of these systems includes a terminal device and a network device. The system further includes a core network part, e.g., an Evolved Packet System (EPS) or 5G system (5GS).

FIG. 1 shows applicable network architecture according to an embodiment of the present disclosure. As shown in FIG. 1, the network architecture includes a terminal 11 and a network device 12.

The terminal involved in the embodiments of the present disclosure is a device for providing voice data and/or any other service data to a user, e.g., a handheld device having a wireless connection function, or any other processing device capable of being connected to a wireless modem. In different systems, the terminal device may have different names. For example, in a 5G system, the terminal device is called as User Equipment (UE). A wireless terminal device communicates with one or more Core Networks (CNs) via a Radio Access Network (RAN). The wireless terminal device may be a mobile terminal, e.g., a mobile phone (or cellular phone), or a computer having the mobile terminal device, e.g., a portable, pocket-sized, handheld, built-in or vehicle-mounted mobile device, which are capable of exchanging voice and/or data with the RAN. For example, the wireless terminal device may be a Personal Communication Service (PCS) telephone, a cordless telephone, a Session Initiation Protocol (SIP) phone, a Wireless Local Loop (WLL) station, or a Personal Digital Assistant (PDA). In addition, the wireless terminal device may also be called as system, subscriber unit, subscriber station, mobile station, mobile, remote station, remote terminal, access terminal, user terminal, user agent or user device, which will not be further particularly defined herein.

The network device involved in the embodiments of the present disclosure may be a base station which includes a plurality of cells providing services for the terminal. Depending on different application scenarios, the base station is called as an access point, a device in an access network in communication with the wireless terminal device through one or more sectors on an air interface, or any other name. The network device is used to exchange a received air frame with an Internet Protocol (IP) packet, and it serves as a router between the wireless terminal device and the other part of the access network. The other part of the access network includes an IP communication network. The network device may further coordinate attribute management on the air interface. For example, the network device involved in the embodiments of the present disclosure is a Base Transceiver Station (BTS) in the GSM or CDMA system, a NodeB in the WCDMA system, an evolutional Node B (eNB, or e-NodeB) in the LTE system, a 5G base station (gNB) in 5G network architecture (next generation system), a 6G base station in 6G network architecture, a Home evolved Node B (HeNB), a relay node, a femto, or a pico, which will not be further particularly defined herein. In some network structures, the network device includes a Centralized Unit (CU) and a Distributed Unit (DU), which may be geographically separated from each other.

Multi Input Multi Output (MIMO) transmission is performed between the network device and the terminal each with one or more antennae, and the MIMO transmission may be Single User MIMO (SU-MIMO) or Multiple User MIMO (MU-MIMO). Depending on the form of an antenna combination and the quantity of antennae, the MIMO transmission may be 2D-MIMO, 3D-MIMO, FD-MIMO or massive-MIMO, and it may also be diversity transmission, precoding transmission or beam-forming transmission.

As shown in FIG. 2, the present disclosure provides in some embodiments a resource determination method, which includes Step 201 of determining, by a communication device, a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

Each of the SI signaling and the PDCCH signaling is received by the UE in an idle state or an inactive state. For example, the SI signaling is System Information Block (SIB) signaling, and the PDCCH signaling is paging Downlink Control Information (DCI).

The predefined rule may be a rule predefined in a protocol, or a rule pre-agreed by the UE with the network side. To be specific, the predefined rule is a rule for determining a specific resource position of the first resource.

The configuration content pre-agreed by the network side with the UE, the configuration content obtained by the UE through the SI signaling and the configuration content obtained by the UE through the PDCCH signaling are different parameters. For example, a first configuration parameter set for the first resource is pre-agreed by the network side with the UE, a second configuration parameter set for the first resource is configured by the network device through the SI signaling, and a third parameter set for the first resource is configured by the network device through the PDCCH signaling.

The first resource is a transmission resource of the reference signal from the view point of the network device, and a reception resource of the reference signal from the view point of the UE.

The reference signal may include one of a TRS, a CSI-RS or a PEI.

It should be appreciated that, the first resource may also be called as a reference signal resource or a reference signal resource set, e.g., a CSI-RS resource, a TRS resource or a PEI resource, or a CSI-RS resource set, a TRS resource set or a PEI resource set.

The UE may receive the reference signal on the first resource, and the network device may transmit the reference signal on the first resource.

According to the embodiments of the present disclosure, the communication device determines the first resource in accordance with the information content. As a result, it is unnecessary to determine a transmission position of the reference signal in accordance with RRC signaling, so it is able to reduce the power consumption of the communication device.

Optionally, the determining the first resource includes determining a first period of the first resource. The first period may be a transmission period of the reference signal.

Optionally, the first period is a function of a paging period, or the first period is a function of the paging period and the quantity of paging frames within the paging period, or the first period is a function of an SSB period.

The function may be pre-defined in a protocol or configured by the network side. For example, when the first period is the function of the paging period, the first period is expressed as T_CSI-RS=f(T,N)=K*T/N, or T_CSI-RS=f(T)=T/2K, where K=1, 2, 3, . . . , T_CSI-RS represents the first period, T represents a Discontinuous reception (DRX) period, and N represents the quantity of Paging Frames (PFs) within the DRX period.

It should be appreciated that, in the embodiments of the present disclosure, the first period is not limited to be the function of the paging period.

For example, when the first period is the function of the paging period and the quantity of paging frames within the paging period, the first period is expressed as T_CSI-RS=f(T,N)=K*(T/N), or T_CSI-RS=f(T,N)=(T/N)/2K, where K=1, 2, 3, . . . .

It should be appreciated that, in the embodiments of the present disclosure, the first period is not limited to be the function of the paging period and the quantity of paging frames within the paging period.

For example, when the first period is the function of the SSB period, the first period is a product of the SSB period and a scaling factor alpha, where alpha={¼, ½, 1, 2}.

Optionally, in the case that the first period is the function of the paging period, the quantity of first resources within the first period corresponds to the quantity of POs of the paging frame.

When the quantity of first resources within the first period corresponds to the quantity of POs of the paging frame, there is a function relationship or table relationship between the quantity of first resources and the quantity of POs of the paging frame, and these relationships are agreed in a protocol or configured by the network side. For example, the quantity of first resources within the first period is equal to the quantity of POs of the paging frame, or the quantity of first resources within the first period is equal to half of the quantity of POs of the paging frame, which will not be further particularly defined herein.

In the embodiments of the present disclosure, the quantity of first resources within the first period corresponds to the quantity of POs of the paging frame, so it is able for the UE to detect the paging in a better manner.

Optionally, the first period is pre-agreed by the network side with the UE, or at least one candidate period is pre-agreed by the network side with the UE and the first period is determined in the at least one candidate period through the SI signaling.

In the embodiments of the present disclosure, it is able to flexible configure the first period.

In addition, relevant information of the first period of the first resource set is pre-agreed by the network side with the UE, and then the first period of each first resource is configured by the network device through the SI signaling.

Optionally, the resource determination method further includes determining, by the communication device, a common time-domain offset value of the first resource corresponding to a plurality of POs within a target paging frame in accordance with the SI signaling, or determining, by the communication device, at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

The common time-domain offset value and the at least one time-domain offset value are a time-domain offset value of the reference signal corresponding to the first period. The at least one time-domain offset value may be a respective time-domain offset value configured for each of the POs within the PF.

The resource position includes at least one of a start position of the first resource or an end position of the first resource, or the resource position is used to indicate that the start position of the first resource is after the resource position or the end position of the first resource is before the resource position.

When the start position of the first resource is after the resource position, the reference signal is transmitted after the resource position, and when the end position of the first resource is before the resource position, the reference signal is transmitted before the resource position.

Through the common time-domain offset value and the at least one time-domain offset value, it is able to flexibly configure the quantity of first resources in periods.

Optionally, the resource determination method further includes determining, by the communication device, a time-domain offset value of the first resource within the first period in accordance with the SI signaling, and the time-domain offset value is an offset value of the first resource relative to the target paging frame, or the time-domain offset value is an offset value of the first resource relative to an SSB.

The target PF may be a predefined PF or a PF indicated by the network side in advance. The SSB may be a target SSB, e.g., a predefined SSB or an SSB indicated by the network side in advance.

In the embodiments of the present disclosure, the time-domain offset value of the first resource within the first period is determined, so it is able to accurately determine a specific position of the first resource.

Optionally, the determining the first resource includes determining a resource position of the first resource.

The determining the resource position of the first resource may be determining a specific time-domain position of the first resource, and in the case that the first resource indicates a resource set, determining a resource position of each resource in the resource set.

The resource position of the first resource may be a resource position configured through the SI signaling or the PDCCH signaling, or a resource position predetermined by the network side with the UE.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter. The time-domain parameter of the first resource may be a time-domain parameter related to the period corresponding to the first resource.

Optionally, the time-domain parameter includes at least one of a time-domain offset value of the first resource, a relevant parameter of the paging period, or a relevant parameter of the paging frame. The predefined rule may be used to indicate a correspondence, e.g., a table relationship or a function relationship, between the resource position of the first resource and a resource corresponding to the time-domain parameter.

Optionally, the predefined rule is used to indicate that the resource position of the first resource is associated with at least one of an identity of the UE, the time-domain offset value of the first resource, the relevant parameter of the paging period or the relevant parameter of the paging frame.

For example, the predefined rule is used to indicate the function relationship between the resource position of the first resource and at least one of the identity of the UE, the time-domain offset value of the first resource, the relevant parameter of the paging period or the relevant parameter of the paging frame.

During the implementation, the resource position of the first resource is determined in accordance with the predefined rule and the time-domain parameter, so it is able to reduce an overhead of the SI signaling or the PDCCH signaling.

Optionally, the determining the first resource includes: determining a transmission beam of the first resource; or determining the first resource for at least one beam.

The first resource for the at least one beam may be determined in accordance with the SI signaling or the PDCCH signaling, or pre-agreed, or deduced in accordance with the predefined rule. To be specific, the first resource for each beam of the at least one beam may be determined.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

The candidate resource is a candidate transmission resource of the reference signal, and the candidate resource is configured in the information content. For example, the transmission beam of the first resource is indicated implicitly through the first resource or the candidate resource.

When the transmission beam of the first resource is determined in accordance with the SI signaling, the transmission beam of the first resource is directly configured through the signaling. It should be noted that, the transmission beam of the first resource may also be configured through the PDCCH signaling.

When the transmission beam of the first resource is determined in accordance with the transmission beam for the SI signaling or the PDCCH signaling, the transmission beam of the first resource is indicated implicitly through the transmission beam for the SI signaling or the PDCCH signaling, or there is an association relationship between the transmission beam of the first resource and the transmission beam for the SI signaling or the PDCCH signaling. Here, the association relationship may be agreed in a protocol or configured by the network side.

Optionally, the determining the first resource for at least one beam includes determining the first resource for the at least one beam in accordance with the SI signaling, wherein the SI signaling is used to indicate the first resource for the at least one beam.

When the SI signaling is used to indicate the first resource for the at least one beam, the first resource for the at least one beam is indicated explicitly through the SI signaling.

Optionally, the SI signaling is used to indicate the first resource for the at least one beam through a correspondence between a TCI state of the first resource for the at least one beam and an SSB.

During the implementation, the correspondence between the TCI state of the first resource for the at least one beam and the SSB is notified through the SI signaling, so as to indicate the first resource for the at least one beam through the correspondence.

During the implementation, the first resource for the at least one beam is indicated through the correspondence between the TCI state of the first resource for the at least one beam and the SSB, so it is able to reduce an overhead of the SI signaling.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

When the bits in the bitmap are associated with the SSB transmission beam, each position in the bitmap corresponds to a respective one SSB transmission beam. For example, a first position in the bitmap corresponds to a first transmission beam of the SSB, a second position in the bitmap corresponds to a second transmission beam of the SSB, and so on.

The index of each first resource may be an index of the first resource in a plurality of first resources. The plurality of first resources is preconfigured, or configured through the SI signaling or the PDCCH signaling, or pre-agreed by the network side with the UE.

When the position index of the target element is associated with the index of the first resource, the position index of each target element corresponds to an index of a respective one first resource. For example, a first one of the first resources corresponds to a first target element in the bitmap, a second one of the first resources corresponds to a second target element in the bitmap, and so on.

When the target element is a non-zero element, as shown in FIG. 3, a first non-zero element is associated with a first one of the first resources, and a second non-zero element is associated with a second one of the first resources. In addition, each element corresponds to a respective one SSB beam, so it is able to obtain the first resource for each transmission beam.

During the implementation, through the bitmap, it is able to flexibly configure the first resource for the at least one beam, as well as the quantity of first resources.

It should be appreciated that, in the embodiments of the present disclosure, the correspondence between the TCI state of the first resource for the at least one beam and the SSB is not limited to be indicated through the bitmap. For example, the correspondence between the TCI state of the first resource for the at least one beam and the SSB may also be indicated in the form of a table.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

The first offset value may be preconfigured, or agreed in a protocol.

The first signal and the second signal are any two of the TRS, the CSI-RS, the PEI and the SSB. For example, the first signal is the TRS and the second signal is the CSI-RS, or the first signal is the TRS and the second signal is the PEI, or the first signal is the TRS and the second signal is the SSB, or the first signal is the PEI and the second signal is the SSB.

When configuring the second offset value of the first resource of the first signal for the at least one beam relative to the first offset value, the second offset value of the first resource for each beam relative to the first offset value is configured, e.g., offset 1, offset 2, . . . , offset X.

Further, each second offset value may be bound to a respective one SSB, so as to indicate the TCI state of the reference signal implicitly through the position of the reference signal. The TCI state is further bound to the SSB, so it is able to minimize a signaling overhead for configuring the TCI state in configuration signaling of the reference signal, thereby to remarkably reduce a resource overhead of the signaling.

Optionally, the determining the first resource includes determining a frequency-domain position of the first resource.

The determining the frequency-domain position of the first resource includes determining the frequency-domain position of the first resource in accordance with the SI signaling, or the PDCCH signaling, or pre-agreement or predefined rule. In addition, the determining the frequency-domain position of the first resource includes determining a part of, or all of, frequency-domain configuration parameters of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a CORESET or an initial BWP.

The association refers to specific positions of a start frequency-domain position and an end frequency-domain position of the first resource in the active bandwidth, the CORESET or the initial BWP, and these specific positions are pre-agreed by the network side with the UE.

During the implementation, the frequency-domain position of the first resource is pre-agreed by the network side with the UE, so as to reduce the signaling overhead.

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

The determining the first resource updated through the PDCCH signaling in accordance with the PDCCH signaling includes, when the PDCCH signaling has been obtained, determining that the currently-updated first resource goes into effect. In this way, it is able to update the first resource in a simple manner.

The determining, in accordance with the PDCCH signaling and the predefined rule, the first resource updated through the PDCCH signaling includes, when the PDCCH signaling has been obtained, determining the first resource updated through the PDCCH signaling in accordance with the predefined rule.

For example, the determining, in accordance with the PDCCH signaling and the predefined rule, the first resource updated through the PDCCH signaling includes determining that the first resource updated through the PDCCH signaling goes into effect at a target time after the reception of the PDCCH signaling, and the target time is defined in the predefined rule.

The target time is expressed as a Th_PDCCH time interval. Th_PDCCH is a broadcast value configured by the network device through an SIB signaling, or a preset value pre-agreed by the network device with the UE.

During the implementation, at the target time after the reception of the PDCCH signaling, the CSI-RS resource previously configured through the PDCCH signaling does not go into effect.

Optionally, the determining the first resource includes determining a TCI state of the first resource.

The first resource may be a first resource set, e.g., a TRS/CSI-RS resource set, and each TRS/CSI-RS resource set includes at least one CSI-RS resource.

In this way, it is able to configure a same TCI state for the same first resource set, thereby to reduce the system overhead.

Optionally, the TCI state of the first resource is same as a TCI state of a transmitted SSB, or the first resource is associated with the transmitted SSB.

The transmitted SSB may be understood as an actually-transmitted SSB. When the TCI state of the first resource is same as the TCI state of the transmitted SSB, the TCI state of the first resource is same as the TCI state of the SSB corresponding to the first resource. At this time, it is unnecessary to configure the TCI state of the first resource, so it is able to further reduce the overhead. In addition, the transmitted SSB is an SSB notified through the SI to be transmitted, e.g., an SSB notified through SIB 1 to be actually transmitted.

When the first resource is associated with the transmitted SSB, the TCI state of the first resource is same as the TCI state of the associated SSB, or there is a Quasi Co-Location (QCL) relationship between the first resource and the SSB.

It should be appreciated that, the first resource may be a plurality of first resources, e.g., a plurality of TRS/CSI-RS resource sets corresponding to different SSBs, respectively, so as to determine the TCI states of the plurality of TRS/CSI-RS resource sets.

Optionally, an index of the first resource is associated with an identity of the SSB, and the index of the first resource is an index indicated explicitly or implicitly.

When the index of the first resource is associated with the identity of the SSB, the index of the first resource is associated with the identity of the SSB corresponding to the first resource. In this way, it is able to determine the corresponding SSB in accordance with the index of the first resource, thereby to determine the TCI state of the corresponding SSB as the TCI state of the first resource.

Optionally, indices of a plurality of first resources are sequenced in accordance with an order of the corresponding SSBs.

The plurality of first resources may be configured by the network side. When the indices of the plurality of first resources are sequenced in accordance with the order of the corresponding SSBs, the indices of the plurality of first resources are sequenced in an ascending or descending order of the SSBs. In this way, it is able to determine the SSB corresponding to each first resource, thereby to determine the TCI state of each first resource.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

For example, when the indices of the plurality of first resources are indicated explicitly in the resource configuration information of the first resource, the network device directly configures an index for each first resource, and when the indices of the plurality of first resources are indicated implicitly in the resource configuration information of the first resource, the network device indirectly configures an index for each first resource. Each piece of resource configuration information (e.g., CSI-RS resource config) includes one first resource. In this way, when the index of the resource configuration information is configured by the network device for the UE through the SI, the index is configured for each first resource.

When the quantity of bits in the bitmap is associated with the transmitted SSB, the quantity of bits in the bitmap is an integral multiple of the transmitted SSBs. For example, three first resources configured for the UE are sequenced in an ascending order of SSB identities, and bitmap=[1 0 1 0 1] means that a first one of the first resources is associated with SSB1, a second one of the first resources is associated with SSB3, and a third one of the first resources is associated with SSB5.

When the index of the first resource is same as the identity of the associated SSB, the TCI state of the first resource is associated with the TCI state of the SSB.

Through determining the first resource and the SSB associated with each other as mentioned hereinabove, it is able to reduce the system overhead.

According to the embodiments of the present disclosure, the communication device determines the first resource in accordance with the information content. The first resource is a transmission resource for the reference signal. The information content includes at least one of the configuration content pre-agreed by the network side with the UE, the configuration content obtained by the UE through SI signaling, the configuration content obtained by the UE through PDCCH signaling, or the predefined rule. The communication device is the UE or the network device. It is unnecessary to determine a transmission position of the reference signal in accordance with RRC signaling, so it is able to reduce the power consumption of the communication device.

The resource determination method will be described illustratively hereinafter in conjunction with the embodiments.

First Embodiment

In this embodiment of the present disclosure, the network side and the UE configure a time-domain transmission resource (i.e., the first resource) for the CSI-RS through a first configuration parameter set that is pre-agreed, and/or the network device configures a time-domain transmission resource for each reference signal through a second parameter set configured through the SI signaling.

For example, the network side and the UE configure a time-domain transmission period of a CSI-RS or a CSI-RS set through the first configuration parameter set that is pre-agreed, and/or the network device configures a time-domain transmission period (i.e., the first period) of each CSI-RS or each CSI-RS set through the second parameter set configured through the SI signaling. The time-domain transmission period is a function of a paging period T. The quantity of periodic CSI-RSs configured by the network device is bound to the quantity of POs configured within a target paging frame, i.e., the quantity of time-domain transmission resources for the CSI-RS within the period is bound to the quantity of POs configured within the target paging frame. For example, a CSI-RS period (T_CSI-RS) is a linear function of the paging period and the quantity of paging frames within each paging period, i.e., $T\_CSI\text{-}RS = f(T,N) = K*T/N$ and/or $T\_CSI\text{-}RS = f(T) = T/2K$, where K=1, 2, 3, . . . . More specifically, the quantity of periodic CSI-RSs configured by the network device is bound to the quantity of POs configured within the target paging frame. When T_CSI-RS is equal to the paging period, optionally, the network device configures a CSI resource set with a period of T_CSI-RS for each of Ns POs within the target paging frame. In this way, the network device configures CSI-RS sets with a plurality of periods for the UE in the connected state, as shown in FIG. 4. In a first configuration mode, the first configuration parameter set of the CSI-RS resource includes a plurality of candidate parameters corresponding to the CSI-RS period, e.g., T_CSI-RS is set as the paging period T. At this time, it is unnecessary for the network device to notify the UE of T_CSI-RS through the SIB signaling, and the time-domain transmission period of the CSI-RS is configured through the pre-agreed first parameter set. In a second configuration mode, the network device and the UE configures in advance candidate values of a plurality of CSI-RS resource periods through a predefined rule, for example, the candidate values are [⅛, ¼, ½, 1]*T, and the network device may notify the UE of the period corresponding to each CSI-RS resource through few bits of the SIB signaling (e.g., 2 bits). In a third configuration mode, the network device and the UE determine values of the CSI-RS resource periods through a predefined rule. For example, the network device and the UE determine a size of each CSI-RS resource period at least in accordance with the paging period and the quantity of POs within one paging period. For example, when the quantity of POs within one paging period is smaller than or equal to 4, the CSI-RS resource period corresponding to the predetermined target PO is T/N, and when the quantity of POs within one paging period is greater than 4, the CSI-RS resource period corresponding to the predetermined target PO is T. In the third configuration mode, the UE and the network device may deduce the size of the CSI-RS resource period through the predefined rule without any signaling overhead. Through this scheme, the network device may configure very limited periodic CSI-RS resources for the UE, e.g., at most periodic CSI-RS resources which is equal to the maximum quantity Ns=4 of the POs within the paging frame, thereby it is able to flexibly configure the CSI-RS resources of one period for each UE in a cell. In addition, it is able to reduce the signaling overhead of the SI. It should be noted that, in the embodiments of the present disclosure, the network device may also directly notify the UE of the specific value of the CSI-RS period through the SIB signaling, i.e., the CSI-RS period is included in the second configuration parameter set and configured by the network device through the SIB signaling.

The network device further configures a time-domain offset value for the UE through the second parameter set carried in the SIB signaling. For example, the network device configures a common time-domain offset value for the time-domain transmission resource of the CSI-RS corresponding to a plurality of POs within the target paging frame through the SIB signaling, or configures a respective time-domain offset value for each of the POs within one paging frame. The time-domain offset value is a time-domain offset of the periodic CSI-RS resource corresponding to the period. When the network device configures one common offset value for the time-domain transmission resource of the CSI-RS corresponding to the plurality of POs within one paging frame through the SIB signaling, it is able for the network device to configure a plurality of time-domain transmission resources of the CSI-RSs with different periods, thereby to improve the flexibility when the time-domain transmission resources of the CSI-RSs are used by the UE in the connected state. When the network device configures a plurality of offset values for the time-domain transmission resource of the CSI-RS corresponding to the plurality of POs within one paging frame through the SIB signaling, the network device may control a position of the time-domain transmission resource of the CSI-RS within each period, and the network device may, through an offset value corresponding to the appropriate configuration, enable the time-domain transmission resources of the CSI-RSs corresponding to different POs to have a same position, so as to share the same time-domain transmission resource of the CSI-RS. For example, the network device appropriately configures the time-domain offset value in such a manner that the time-domain transmission resources of the CSI-RSs corresponding to a plurality of POs within one paging frame correspond to time-domain transmission resources of the CSI-RSs within one period. In this way, the network device may configure the offset values for different periodic CSI-RS resources through the SIB signaling, such that the network device may flexibly configure the quantity of periodic CSI-RS resources, thereby to make an optimal compromise between the flexibility and the overhead.

In some embodiments of the present disclosure, the time-domain transmission position of the CSI-RS determined in accordance with the CSI-RS resource period and/or the offset value is preferably that a transmission start point of the time-domain transmission resource of the CSI-RS, or the transmission start point of the time-domain transmission resource of the CSI-RS is after the time-domain transmission position of the CSI-RS. The determined time-domain transmission position of the CSI-RS may also be that an end point of the time-domain transmission resource of the CSI-RS, or the end point of the time-domain transmission resource of the CSI-RS is before the determined time-domain transmission position of the CSI-RS. The meaning of the position of the time-domain transmission resource of the CSI-RS in the following embodiments is the same as that mentioned hereinabove, and thus will not be repeatedly defined.

It should be appreciated that, in the embodiments of the present disclosure, the reference signal is also called as a reference signal resource, e.g., a CSI-RS is also called as a CSI-RS resource, and a CSI-RS set is also called as a CSI-RS resource set.

Second Embodiment

In this embodiment of the present disclosure, the network side and the UE configure a time-domain transmission resource for a CSI-RS or a CSI-RS set through a first configuration parameter set that is pre-agreed, and/or the network device configures a time-domain transmission resource or a time-domain transmission resource set corresponding to each CSI-RS through a second parameter set configured through the SI signaling.

Figure 5:
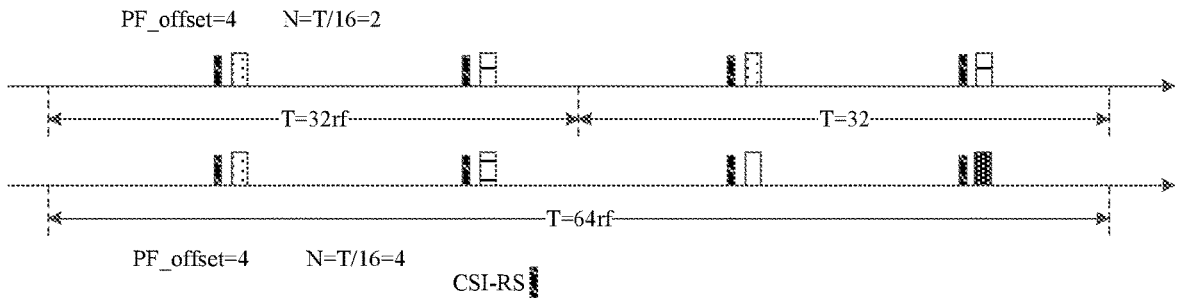
FIG. 5 is yet another schematic view showing the first resource according to an embodiment of the present disclosure.

For example, the network side and the UE configure a time-domain transmission period of a CSI-RS set through the first configuration parameter set that is pre-agreed, and/or the network device configures a time-domain transmission period of each CSI-RS through the second parameter set configured through the SI signaling. Preferably, a transmission period of the CSI-RS set is pre-agreed by the network device with the UE, and the CSI-RS period is a function of the paging period T and the quantity N of paging frames within each paging period. For example, the CSI-RS period T_CSI-RS is a linear function of the paging period and the quantity of paging frames within each paging period, i.e., T_CSI-RS=f(T,N)=K*(T/N), and/or T_CSI-RS= f(T,N)=(T/N)/2K, where K=1, 2, 3, . . . . Advantageously, although the paging period for each UE may be UE-specific and the paging periods are different from each other, from the view point of the network device, the time-domain transmission resource set of the CSI-RSs with a period of T_CSI-RS is configured for all the UEs in a current cell, as shown in FIG. 5. Through this period configuration method, it is able for the UE in the connected state to achieve a channel tracking function. The first configuration parameter set of the time-domain transmission resource of the CSI-RS includes a plurality of candidate parameters corresponding to the CSI-RS period. For example, the CSI-RS period T_CSI-RS may be preset as {(T/N)/16, (T/N)/8, (T/N)/4, (T/N)/2, (T/N), 2*(T/N), 4*(T/N), 8*(T/N)}, i.e., it includes three bits. At this time, it is merely necessary for the network device to notify the UE of the 3-bit CSI-RS period (T_CSI-RS) through the SIB signaling, i.e., to configure the time-domain transmission period of the CSI-RS through the second parameter set configured through the SI signaling. In this way, it is able to effectively reduce the signaling overhead of the SI.

Apart from the CSI-RS period configuration being a function of the paging period, the CSI-RS period is also a function of the SSB period. For example, the CSI-RS period is a product of the SSB period and a scaling factor alpha, where alpha={¼, ½, 1,2}. Through a method pre-agreed with the UE, the network device configures candidate values of the scaling factors in the first configuration parameter set, and notifies, e.g., through two bits, the UE of a specific selection (e.g., a specific scaling factor) in the second configuration parameter set through the SIB signaling, so that the UE obtains the configuration period of the CSI-RS in accordance with the SSB period and the scaling factor of the SSB period.

The network side further configures the time-domain offset value for the UE in accordance with the second parameter set configured through the SI signaling, and the time-domain offset value may be a time-domain offset of the periodic CSI-RS resource corresponding to the period.

In addition, the network device may configure a time-domain offset value for the CSI-RS with a period (the period is a function of the paging period T and the quantity N of paging frames within each paging period) through the SIB signaling. Preferably, the offset value is an offset value of the CSI-RS relative to the target paging frame, or an offset value of the CSI-RS relative to the target SSB. At this time, from the view point of the network device, the CSI-RSs configured by the network device have a same period. For example, when the CSI-RS corresponds to the TRS, generally speaking, a plurality of CSI-RSs in one CSI-RS set have a same TCI state (i.e., a same beam direction), and the CSI-RSs having a same beam direction have a same period. One or more POs within the CSI-RS period correspond to a same CSI-RS.

Third Embodiment

In this embodiment of the present disclosure, the network side and the UE configure a time-domain transmission resource of each CSI-RS through a second parameter set, and/or deduce a specific position of the time-domain transmission resource of the CSI-RS through a predefined rule.

For example, the network device notifies the UE of a time-domain parameter related to the period corresponding to the time-domain transmission resource of the CSI-RS through the SIB signaling, e.g., a CSI-RS time-domain offset value (TRS_offset) and/or a scaling factor M of the CSI-RS period. When the network device and the UE determine the time-domain transmission resource of the CSI-RS through the predefined rule, the time-domain transmission resource of the CSI-RS at least includes a User Equipment Identity (UEID), a paging period, and a function of the CSI-RS time-domain offset value thereof, e.g., (SFN+TRS_offset)

mod T=(T/N/M)*(UE_ID mod N), where M=1, 2, 4, 8, . . . , the System Frame Number (SFN) is an SFN corresponding to the CSI-RS resource, T represents the paging period, N represents the quantity of paging frames within the paging period, and M represents a scaling factor related to the paging period or a frame spacing between adjacent paging frames. Correspondingly, the UE determines the position of the time-domain of the transmission resource of the CSI-RS through the predefined rule in accordance with the UEID, the paging period configured by the network device through the SIB, the CSI-RS offset value, and the period-related time-domain parameter.

Preferably, the network side and the UE configure a scrambling code ID corresponding to the reference signal (CSI-RS/TRS) through a pre-agreed method, and the scrambling code ID, as an initial value, is used to generate a pseudorandom sequence corresponding to the reference signal. The scrambling code ID is defined explicitly in a protocol, or obtained through the method pre-agreed by the network device with the UE. For example, as pre-agreed by the network device with the UE, a scrambling sequence configured for the PEI through the SIB signaling corresponds to the scrambling code ID of the reference signal.

Fourth Embodiment

In this embodiment of the present disclosure, the network side and the UE configure a transmission resource of the CSI-RS or a transmission resource set of the CSI-RS through a pre-agreed first configuration parameter set, and/or the network side deduces a specific position of the CSI-RS transmission resources or CSI-RS transmission resource set using different transmission beams through a second parameter set configured by the network side for the UE through the SI signaling and/or a predefined rule.

First Scheme: the transmission beam of the CSI-RS is implicitly indicated through a candidate transmission resource or the transmission resource of the CSI-RS. Optionally, the network device explicitly indicate an actual transmission resource/beam of the CSI-RS through the SIB signaling.

Figure 6:
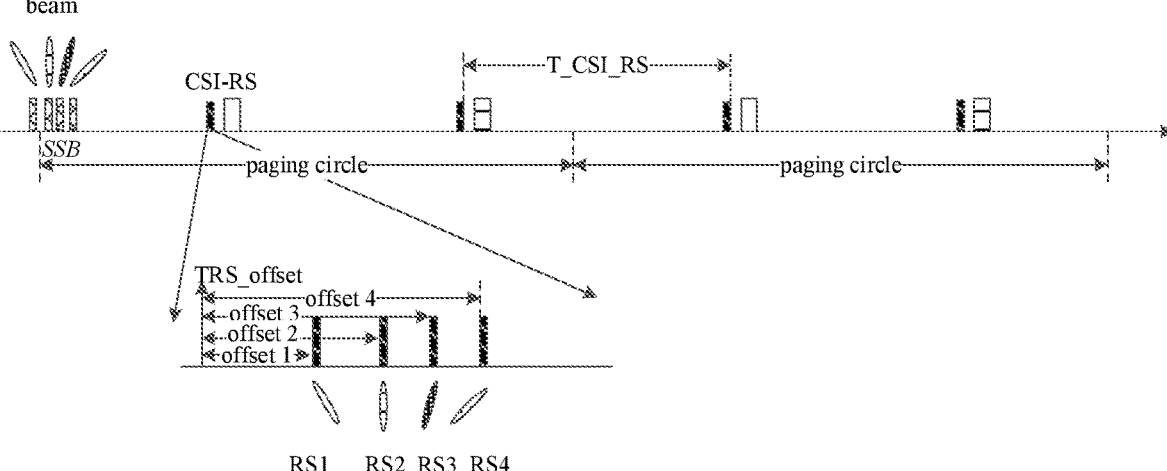
FIG. 6 is still yet another schematic view showing the first resource according to an embodiment of the present disclosure.

At first, the transmission beam of the CSI-RS is implicitly indicated through the candidate transmission resource or the transmission resource of the CSI-RS. For example, the network device configures the period T_CSI-RS of the CSI-RS or CSI-RS set and the time-domain offset TRS_offset using the method in the first or second embodiment, as shown in FIG. 6. The network device and the UE determine the transmission resources of different CSI-RSs and the corresponding transmission beams, and notifies the UE of the position of the transmission resource of the CSI-RS corresponding to at least one beam through a pre-agreed method or through the SIB signaling. Preferably, the network device notifies the UE of second offset values, i.e., offset 1, offset 2, . . . , offset X, of the position of the transmission resource of the CSI-RS corresponding to each beam relative to a first offset value (TRS_offset) through the SIB signaling, and each second offset value is bound to a respective one SSB. More specifically, the network device notifies the UE of the quantity X of the actually-transmitted SSBs through SIB1 in accordance with a position of the SSB in a synchronization signal set (ssb-PositionsInBurst), and a plurality of elements in the second offset value correspond to the X SSBs respectively, as shown in FIG. 6, where each of the RS1, RS2, RS3 and RS4 represents the reference signals. Advantageously, the TCI state of the CSI-RS is implicitly indicated through the position of the CSI-RS, and the TCI state is bound to the SSB, so it is able to minimize the signaling overhead for configuring the TCI state in CSI-RS high-layer configuration signaling, thereby to remarkably reduce the resource overhead of the SI.

Figure 7:
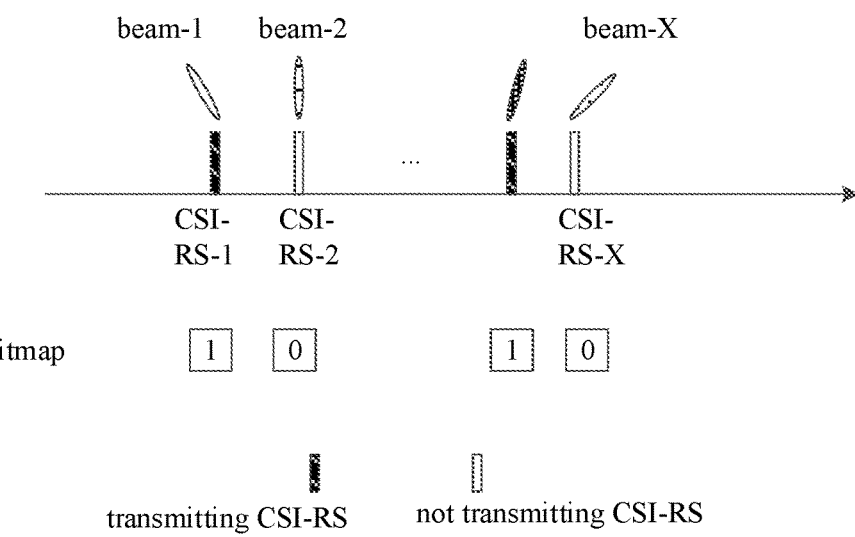
FIG. 7 is still yet another schematic view showing the first resource according to an embodiment of the present disclosure.

Optionally, the network device further explicitly indicates an actual transmission resource or beam of the CSI-RS or indicates the activation or deactivation of the CSI-RS or beam through the SIB signaling. As mentioned hereinabove, the transmission beam of the CSI-RS is implicitly indicated through the candidate transmission position or transmission position of the CSI-RS. For example, the network device and the UE determine X transmission resources of the CSI-RS corresponding to X transmission beams, e.g., X is at most 8 for a Frequency Range 1 (FR1) and X is at most 64 for a FR2. The network device explicitly indicate the actually-transmitted CSI-RS resource/beam through the SIB signaling, as shown in FIG. 7. The network device carries a bitmap about the CSI-RS resource in the SIB signaling, and each element in the bitmap corresponds to a CSI-RS corresponding to one beam. For example, when a first bit in the bitmap has a value of 1, a corresponding CSI-RS is transmitted by the network device through a beam 1 corresponding to a first SSB on a transmission resource of the CSI-RS corresponding to the beam 1; when a second bit in the bitmap has a value of 0, a transmission resource of the CSI-RS corresponding to a beam 2 corresponding to a second SSB is deactivated and the UE assumes that no CSI-RS is transmitted on the transmission resource of the CSI-RS corresponding to the beam 2, and so on. The above-mentioned bitmap is merely for illustrative purposes, and the plurality of beams may also be divided into groups as pre-agreed by the network device and the UE, e.g., one group includes a plurality of adjacent beams. Each bit in the bitmap carried by the network device through the SIB signaling is used to indicate the activation/deactivation of the transmission resource of the CSI-RS corresponding to one group of different beams. As a result, at most 64 beams are supported in FR2, and in a suburb where there are few UEs in the connected state, when 64 beams are configured by the network device for each UE in an idle state, it is probably impossible to configure some CSI-RS resources for the UE in the connected state, so additional reference signals are introduced for the UE in the idle state. In this scheme, it is able to support the transmission of the CSI-RS through different beams, remarkably reduce the overhead for configuring the TCI state, and effectively reduce the overhead for the transmission resource of the CSI-RS, thereby to enable the network device make a compromise between the CSI-RS configuration for the UE in the idle state and the CSI-RS configuration for the UE in the connected state, and prevent much excessive overhead from being introduced into the UE in the idle state.

Second Scheme: the transmission beam of the CSI-RS is implicitly indicated through the transmission beam of the configuration signaling, or the transmission beam of the CSI-RS is associated with the transmission beam of the configuration signaling.

Figure 8:
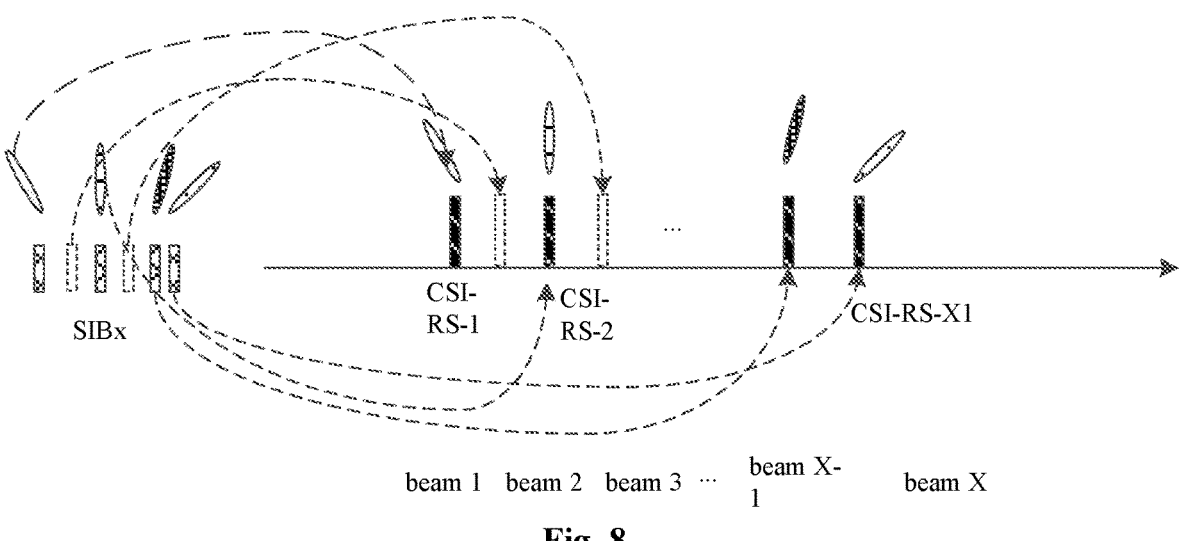
FIG. 8 is still yet another schematic view showing the first resource according to an embodiment of the present disclosure.

For example, the network device configures the transmission resource of the CSI-RS through the SI signaling, and transmits the SI signaling through one or more transmission beams. When the UE fails to receive an SIBx for configuring the transmission resource of the CSI-RS on a current beam, the UE considers that the network device does not configure for the UE any transmission resource of the CSI-RS on the current transmission beam, i.e., the configuration signaling SI. When the UE has received an SIB for configuring the transmission resource of the CSI-RS on the current transmission beam, the UE considers that the transmission beam for the transmission resource of the CSI-RS configured through the current SIB is associated with, e.g., consistent with, the transmission beam for the corresponding SIB configuration signaling, i.e., there is a QCL relationship between the transmission resource of the configured CSI-RS and the SSB corresponding to the configuration signaling SIB with respect to a QCL-type D. As shown in FIG. 8, the network device transmits the SIBx for configuring the transmission resource of the CSI-RS on a beam 1, a beam 3, a beam X-1 and a beam X. It should be appreciated that, when the network device transmits the SIB message on a beam 2 but the SI does not include the SIBx for configuring the transmission resource of the CSI-RS, the UE cannot receive the configuration signaling SIBx corresponding to the transmission resource of the CSI-RS on the beam 2. At this time, the UE assumes that the network device does not configure any CSI-RS message on the beam corresponding to the SIB configuration signaling. Advantageously, the network device may flexibly determine whether to transmit the CSI-RS on a certain beam in accordance with an actual overhead. In addition, in the method where the TCI state is indicated implicitly, no SI signaling overhead occurs. When the network device transmits the SIBx signaling for configuring the transmission resource of the CSI-RS on a certain beam and the UE has received the transmission resource of the CSI-RS, preferably, the resource configuration does not necessarily include information of the QCL-type D, i.e., the beam configuration condition, and the UE assumes that transmission beam for the transmission resource of the CSI-RS carried in the SIBx configured through the current transmission beam is associated with, or corresponds to, the transmission beam for the SIBx signaling. In this way, it is able to implicitly indicate the TCI state of the transmission resource of the CSI-RS without any signaling overhead.

Third Scheme: the network device explicitly indicates a transmission resource of the CSI-RS or a transmission resource set of the CSI-RS for at least one beam through the SIB signaling. In some techniques, the resource configuration of each CSI-RS includes a TCI state configuration field, which leads to a relatively large signaling overhead. The network device configures X1 transmission resources of the CSI-RS for the UE through the SIB signaling, where X1≤X, and X represents the quantity of actually-transmitted SSBs configured by the network device for the UE through SIB1, or the predefined maximum quantity of beams allowed to be configured. Different from the first scheme, in this scheme, the quantity of transmission resources of the CSI-RS corresponding to different beams is not configured to be X, and there exist no different predefined second time-domain offset values or no different second time-domain offset values configured through the signaling. The network device notifies the UE of the information indicating that the TCI state corresponding to the transmission resource of the CSI-RS is bound to the SSB through the SIB signaling. For example, as shown in FIG. 3, the network device notifies the UE of the beam directions corresponding to the configured X1 transmission resources of the CSI-RS through the SIB signaling in a bitmap form. A length of the bitmap is consistent with the total quantity X of SSBs, and positions in the bitmap are associated with the SSB transmission beams or TCI states respectively. For example, a first position in the bitmap corresponds to a first transmission beam of the SSB, a second position in the bitmap corresponds to a second transmission beam of the SSB, and so on. A position index of a non-zero element in the bitmap is associated with an index of the transmission resource of the CSI-RS or transmission resource set of the CSI-RS. For example, a first transmission resource set of the CSI-RS configured by network device corresponds to a first non-zero element in the bitmap, a second transmission resource set of the CSI-RS configured by network device corresponds to a second non-zero element in the bitmap, and so on, as shown in FIG. 3. In this way, the network device may flexibly configure the positions and the quantity of transmission resources or transmission resource sets of the CSI-RS. In addition, the TCI states or the beams for the transmission resources or transmission resource sets of the CSI-RS are bound to the SSB, so it is unnecessary to notify the UE of the beams or TCI state with additional signaling. As compared with the scheme where the TCI state of the CSI-RS resource is configured through the RRC signaling in the connected state, it is able to prevent the configuration flexibility of the network device from being adversely affected, and remarkably reduce the configuration signaling overhead related to the beams.

Fifth Embodiment

In this embodiment of the present disclosure, the network device and the UE configure a frequency-domain resource for the transmission of the CSI-RS through a pre-agreed method, wherein the frequency-domain resource at least is a part of frequency-domain configuration parameters. For example, the network device pre-agrees with the UE a start PRB and an end PRB of the CSI-RS resource, i.e., the activated bandwidth of the UE in the idle state. For example, when the network device has configured CORESET #0 rather than an initial BWP for the UE, the network device pre-agrees with the UE that the start PRB of the transmission resource of the CSI-RS is a lowest PRB of CORESET #0, and the end PRB of the transmission resource of the CSI-RS is a highest PRB of CORESET #0. When the network device has configured the initial BWP for the UE, the network device pre-agrees with the UE that the start PRB of the transmission resource of the CSI-RS is a lowest PRB of the initial BWP, and the end PRB of the transmission resource of the CSI-RS is a highest PRB of the initial BWP. In another case, the network device pre-agrees with the UE a bandwidth occupied by the transmission resource of the CSI-RS. For example, under a bandwidth of 15K, the network device pre-agrees with the UE that a PRB bandwidth includes 52 PRBs or is equal to a bandwidth of CORESET #0 or the initial BWP. In this way, the network device pre-agrees with the UE that the frequency-domain resource at least is a part of the configuration parameters, e.g., the start PRB and the end PRB, or the occupied bandwidth, so as to reduce the overhead of the SI.

Sixth Embodiment

In this embodiment of the present disclosure, the network side and the UE side configures a third parameter set related to the transmission resource or transmission resource set of the CSI-RS through the PDCCH signaling, and/or deuces a specific position of the transmission resource or transmission resource set of the CSI-RS through a predefined rule. At first, the network device configures the transmission resource or transmission resource set of the CSI-RS using the methods in the above first to fourth embodiments through preconfiguration, the SIB signaling or the predefined rule. The network device further configures whether the transmission resource of the CSI-RS exists through the PDCCH signaling. For example, the network device notifies through paging DCI the UE of whether the SI is updated, so as to trigger the UE to receive an update message of the transmission resource configuration of the CSI-RS in the SIB again. The network device further notifies through the paging DCI the UE of, e.g., whether the transmission resource of the CSI-RS configured by the current network device for the UE through the SIB is capable of being reused, or the above-mentioned resource update information. The network device further notifies, through the PEI based on PDCCH, the UE of whether the transmission resource of the CSI-RS configured by the current network device for the UE is to be used continuously, or of the above-mentioned resource update information. The network device notifies through the PDCCH signaling the UE that the transmission resource of the CSI-RS is updated, and when the data transmission for the UE in the connected state has been completed and there is no CSI-RS in the connected state, the network device may not continue to transmit the original transmission resource of the CSI-RS configured through the SIB signaling, so as to enable the network device side to reduce the CSI-RS overhead, and enable the UE to prepare for the reception, e.g., determine whether to receive three SSBs. When the network device configures the CSI-RS resource through the PDCCH signaling, the network device determines an effective time of the PDCCH signaling through a predefined rule.

First Scheme: upon the receipt of new PDCCH signaling and/or new SIB signaling to update the transmission resource of the CSI-RS, the UE assumes that the transmission resource of the CSI-RS currently configured by the network device is always transmitted by the network device. The UE receives the transmission resource of the CSI-RS configured by the current network device so as to reduce the power consumption of the UE. In this way, the signaling is simple, so it is able to reduce the power consumption of the UE.

Second Scheme: upon the receipt of new PDCCH signaling and/or new SIB signaling to update the transmission resource of the CSI-RS, at a time interval Th_PDCCH after the reception of the PDCCH signaling, the UE considers that the transmission resource of the CSI-RS previously configured through the PDCCH signaling does not come into effect any more. Preferably, Th_PDCCH is a broadcasting value configured by the network device through the SIB signaling, or a preset value for the UE. Optionally, upon the receipt of a configuration indicator about the transmission resource of the CSI-RS through the PDCCH signaling, the UE starts a timer, and when a duration of the timer exceeds Th_PDCCH, the UE considers that the signaling does not come into effect. Preferably, the threshold Th_PDCCH is a function of the paging period. In this scheme, it is able to prevent the network device from transmitting the PDCCH signaling continuously to notify the UE of whether the transmission resource of the CSI-RS exists. A probability of transmitting a paging message is very low. When the transmission resource of the CSI-RS is indicated through the PDCCH signaling, in the first scheme, the power consumption of the UE is reduced but the power consumption of the network device is too large; while in the second scheme, it is able to make a good compromise between the power consumption of the network device and the power consumption of the UE.

Seventh Embodiment

In this embodiment of the present disclosure, the network device configures the TCI state information corresponding to the TRS/CSI-RS for the UE in the idle or inactive state through the SI. To be specific, the network device configures the TCI state on the basis of the TRS/CSI-RS resource set, i.e., configures a same TCI state for each same TRS/CSI-RS resource set. Each TRS/CSI-RS resource set includes at least one CSI-RS resource, and one CSI-RS resource set at most includes 64 CSI-RS resources. In this scheme, it is able to remarkably reduce the system overhead. In addition, the TRS/CSI-RS is used by the UE in the idle/inactive state mainly for channel tracking.

An explicit or implicit index of the TRS/CSI-RS resource set configured by the network device is associated with an actually-transmitted SSB notified through SIB1. To be specific, the explicit or implicit indices of the TRS/CSI-RS resource sets are sequenced in an ascending or descending order of the SSB IDs. In particular, there are two following schemes.

Figure 9:
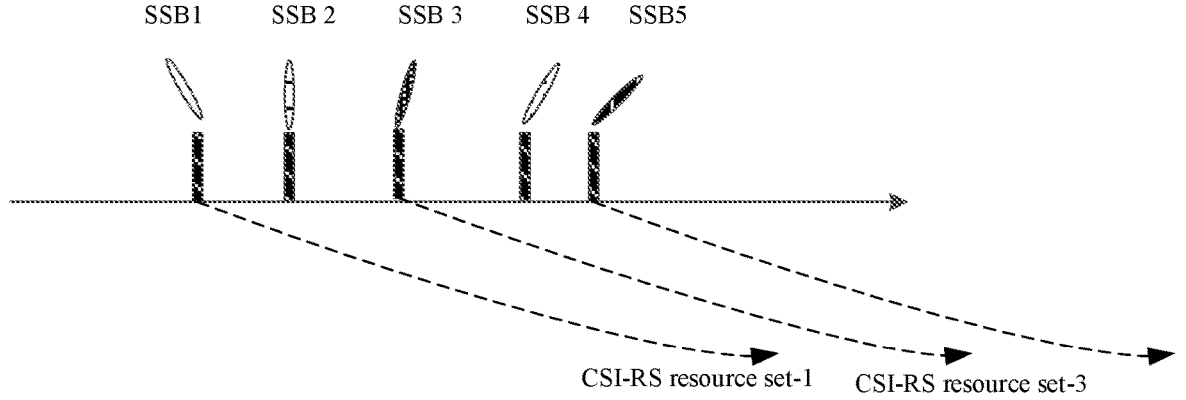
FIG. 9 is still yet another schematic view showing the first resource according to an embodiment of the present disclosure.

First Scheme: the explicit or implicit index of the TRS/CSI/RS resource set configured by the network device is associated with an ID of the SSB in QCL of the TRS/CSI-RS resource set, and the TCI state of the CSI-RS resource is indicated implicitly. The explicit index of the TRS/CSI-RS resource set may refer to an index directly configured by the network device for each TRS/CSI-RS resource set, or an index configured for the TRS/CSI-RS resource set in an implicit manner. When the index is configured for the TRS/CSI-RS resource set in an implicit manner, the index of the TRS/CSI-RS resource set is indirectly configured by the network device. For example, each CSI-RS resource config includes one CSI-RS resource set. In this way, when the network device configures the CSI-RS resource config index for the UE through the SIB, the index is configured for each TRS/CSI-RS resource set. The network device configures the explicit or implicit index of the TRS/CSI-RS resource set as an associated SSB ID, and the associated SSB is in QCL with the TRS/CSI-RS resource set. For example, as shown in FIG. 9, the network device configures M1=5 SSBs for the UE through SIB1, configures M2 TRS/CSI-RS resources for the UE through SIB-X, wherein M2≤M1, e.g., M2=3, and configures the IDs of CSI-RS resource config corresponding to three CSI-RS resource sets as IDs of the SSBs in QCL with the CSI-RS resource sets (ID=1, 3, 5). The UE obtains the SSB ID through SIB1, and then obtains the explicit or implicit index of the TRS/CSI-RS resource set through SIB-X scheduled through SIB1. The UE immediately knows the corresponding SSB ID in accordance with the SSB ID in accordance with the explicit or implicit index of the TRS/CSI-RS resource set, i.e., determines the beam transmission direction of the CSI-RS resource set.

Figure 10:
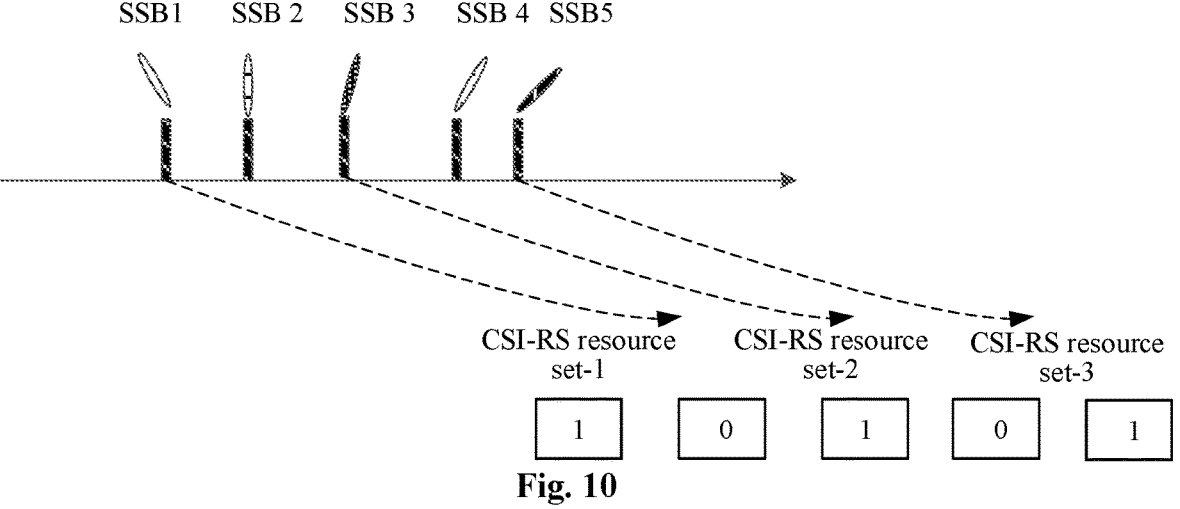
FIG. 10 is still yet another schematic view showing the first resource according to an embodiment of the present disclosure.

Second Scheme: the TRS/CSI-RS resource set configured by the network device is associated with the ID of the SSB in QCL with the TRS/CSI-RS resource set, and the TCI state of the TRS/CSI-RS resource set is explicitly indicated through the signaling. Preferably, the index of the TRS/CSI-RS resource set is an implicit index. For example, the network device configures the CSI-RS resource set for the UE through SIB-X, but does not explicitly configure the index thereof, nor indirectly configure the CSI-RS resource config index, i.e., the network device does not directly or indirectly configure the resource index of the TRS/CSI-RS. In this way, the network device may save the configuration signaling. However, the CSI-RS resource sets are configured by the network device separately, and they are certainly sequenced in an implicit order. At this time, the CSI-RS resource sets may be sequenced in an ascending order, and associate with the corresponding SSBs. As shown in FIG. 10, the network device configures M1=5 actually-transmitted SSBs for the UE through SIB1. When configuring the TRS/CSI-RS resource sets for the UE, the network device further configures a bitmap, and a length of the bitmap is equal to, or an integral multiple of, the quantity of actually-transmitted SSBs. When the length of the bitmap is equal to the quantity M1 of SSBs, three CSI-RS resource sets configured by the network device for the UE are sequenced in an ascending order of the SSB IDs. For example, bitmap=[1 0 1 0 1] represents that a first CSI-RS resource set is associated with SSB1, a second CSI-RS resource set is associated with SSB3, and a third CSI-RS resource set is associated with SSB5. The UE receives SIB1 so as to obtain the ID of the actually-transmitted SSB, and receives SIB-X so as to obtain the CSI-RS resource set configuration and the bitmap information thereof. The UE determines the SSB corresponding to the CSI-RS resource set configured by the network device in accordance with the bitmap, and then determines the TCI state of the CSI-RS resource set. Here, the SSB IDs corresponding to the CSI-RS resource sets are sequenced in an ascending order. It should be noted that, the SSB IDs may also be sequenced in a descending order.

In the second scheme according to the seventh embodiment of the present disclosure, in terms of the signaling overhead, the network device configures the CSI-RS resource set but does not need to configure the corresponding explicit index, and instead, it merely needs to configure a bitmap, so it is able to further reduce the overhead as compared with the first scheme according to the seventh embodiment of the present disclosure.

It should be appreciated that, apart from that mentioned hereinabove, the indices of the CSI-RS resources or resource sets may also be indicated in any other implicit mode. For example, the network device pre-configures transmission time-domain position information of the CSI-RS resource or resource set, and the transmission time-domain position information is taken as an implicit indicator of the index of the CSI-RS resource or resource set.

It should be appreciated that, the above description is given when the reference signal is the CSI-RS. The above embodiments may be directly used for the configuration of the PEI in the idle state. When the resource determination method is adopted for any periodic signal other than the CSI-RS, the PEI and the TRS, it also falls within the scope of the present disclosure.

Figure 11:
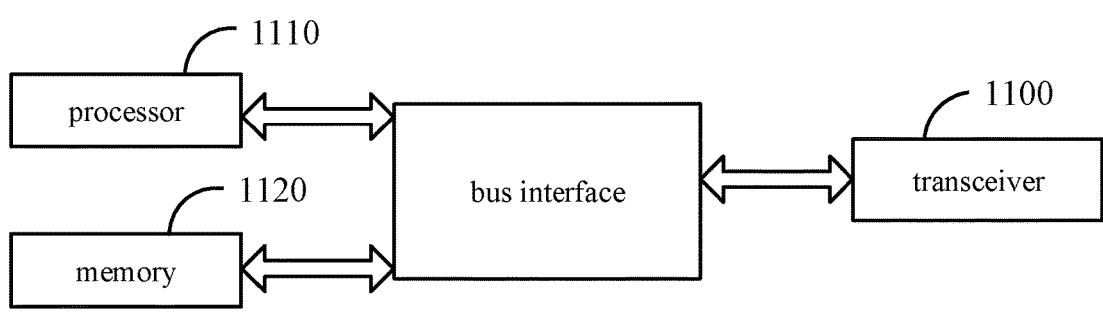
FIG. 11 is a schematic view showing a communication device according to an embodiment of the present disclosure.

As shown in FIG. 11, the present disclosure further provides in some embodiments a communication device, which includes a memory 1120, a transceiver 1100 and a processor 1110. The memory 1120 is configured to store therein a computer program. The transceiver 1100 is configured to transmit and receive data under the control of the processor 1110. The processor 1110 is configured to read the computer program in the memory 1120, so as to determine a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

In FIG. 11, bus architecture may include a number of buses and bridges connected to each other, so as to connect various circuits for one or more processors 1110 and one or more memories 1120. In addition, as is known in the art, the bus architecture may be used to connect any other circuits, such as a circuit for a peripheral device, a circuit for a voltage stabilizer and a power management circuit. A bus interface may be provided, and the transceiver 1100 may consist of a plurality of elements, i.e., a transmitter and a receiver for communication with any other devices over a transmission medium. With respect to different UEs, a user interface 1130 may also be provided for devices which are to be arranged inside or outside the UE, and these devices may include but not limited to a keypad, a display, a speaker, a microphone and a joystick.

The processor 1110 may take charge of managing the bus architecture as well as general processings. The memory 1120 may store therein data for the operation of the processor 1110.

Optionally, the processor 1010 is a Central Processing Unit (CPU), an Application Specific Integrated Circuit (ASIC), a Field-Programmable Gate Array (FPGA) or a Complex Programmable Logic Device (CPLD). The processor may also use multi-core architecture.

The processor is configured to call the computer program in the memory, so as to implement the above-mentioned method in accordance with obtained executable instructions. The processor may also be physically separated from the memory.

Optionally, the reference signal includes one of a TRS, a CSI-RS, or a PEI.

Optionally, the determining the first resource includes determining a first period of the first resource.

Optionally, the first period is a function of a paging period, or the first period is a function of the paging period and the quantity of paging frames within the paging period, or the first period is a function of an SSB period.

Optionally, in the case that the first period is the function of the paging period, the quantity of first resources within the first period corresponds to the quantity of POs of the paging frame.

Optionally, the first period is pre-agreed by the network side with the UE, or at least one candidate period is pre-agreed by the network side with the UE and the first period is determined in the at least one candidate period through the SI signaling, or the first period is determined in accordance with a predefined rule.

Optionally, the processor 1110 is further configured to determine a common time-domain offset value of the first resource corresponding to a plurality of POs within a target paging frame in accordance with the SI signaling, or determine at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

Optionally, the resource position includes at least one of a start position of the first resource or an end position of the first resource, or the resource position is used to indicate that the start position of the first resource is after the resource position or the end position of the first resource is before the resource position.

Optionally, the processor 1110 is further configured to determine a time-domain offset value of the first resource within the first period in accordance with the SI signaling, and the time-domain offset value is an offset value of the first resource relative to the target paging frame, or the time-domain offset value is an offset value of the first resource relative to an SSB.

Optionally, the determining the first resource includes determining a resource position of the first resource.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter.

Optionally, the time-domain parameter includes at least one of a time-domain offset value of the first resource, a relevant parameter of the paging period, or a relevant parameter of the paging frame. The predefined rule is used to indicate that the resource position of the first resource is associated with at least one of an identity of the UE, the time-domain offset value of the first resource, the relevant parameter of the paging period or the relevant parameter of the paging frame.

Optionally, the determining the first resource includes: determining a transmission beam of the first resource; or determining the first resource for at least one beam.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

Optionally, the determining the first resource for at least one beam includes determining the first resource for the at least one beam in accordance with the SI signaling, wherein the SI signaling is used to indicate the first resource for the at least one beam.

Optionally, the SI signaling is used to indicate the first resource for the at least one beam through a correspondence between a TCI state of the first resource for the at least one beam and an SSB.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

Optionally, the determining the first resource includes determining a frequency-domain position of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a CORESET or an initial BWP.

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

Optionally, the determining, in accordance with the PDCCH signaling and the predefined rule, the first resource updated through the PDCCH signaling includes determining that the first resource updated through the PDCCH signaling goes into effect at a target time after the reception of the PDCCH signaling, and the target time is defined in the predefined rule.

Optionally, the determining the first resource includes determining a TCI state of the first resource.

Optionally, the first resource is a first resource set.

Optionally, the TCI state of the first resource is same as a TCI state of a transmitted SSB, or the first resource is associated with the transmitted SSB.

Optionally, an index of the first resource is associated with an identity of the SSB, and the index of the first resource is an index indicated explicitly or implicitly.

Optionally, indices of a plurality of first resources are sequenced in accordance with an order of the corresponding SSBs.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

It should be appreciated that, the communication device in the embodiments of the present disclosure may be used to implement all the steps of the above-mentioned method with a same technical effect, which will not be further particularly defined herein.

Figure 12:
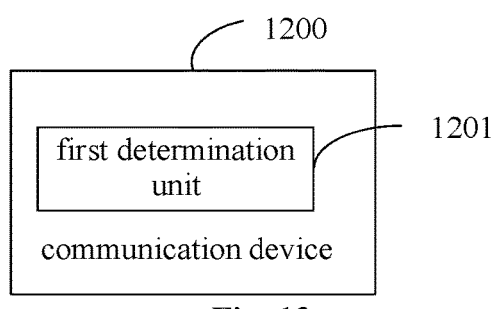
FIG. 12 is another schematic view showing the communication device according to an embodiment of the present disclosure.

As shown in FIG. 12, the present disclosure further provides in some embodiments a communication device 1200, which includes a first determination unit 1201 configured to determine a first resource in accordance with information content. The first resource is a transmission resource for a reference signal. The information content includes at least one of configuration content pre-agreed by a network side with a UE, configuration content obtained by the UE through SI signaling, configuration content obtained by the UE through PDCCH signaling, or a predefined rule. The communication device is the UE or a network device.

Optionally, the reference signal includes one of a TRS, a CSI-RS, or a PEI.

Optionally, the determining the first resource includes determining a first period of the first resource.

Optionally, the first period is a function of a paging period, or the first period is a function of the paging period and the quantity of paging frames within the paging period, or the first period is a function of an SSB period.

Optionally, in the case that the first period is the function of the paging period, the quantity of first resources within the first period corresponds to the quantity of POs of the paging frame.

Optionally, the first period is pre-agreed by the network side with the UE, or at least one candidate period is pre-agreed by the network side with the UE and the first period is determined in the at least one candidate period through the SI signaling, or the first period is determined in accordance with a predefined rule.

Optionally, the communication device further includes a second determination unit configured to determine a common time-domain offset value of the first resource corresponding to a plurality of POs within a target paging frame in accordance with the SI signaling, or determine at least one time-domain offset value of the first resource corresponding to at least one PO within the target paging frame. The common time-domain offset value is used to determine a resource position of the first resource corresponding to the plurality of POs, and the at least one time-domain offset value is used to determine a resource position of the first resource corresponding to the at least one PO.

Optionally, the resource position includes at least one of a start position of the first resource or an end position of the first resource, or the resource position is used to indicate that the start position of the first resource is after the resource position or the end position of the first resource is before the resource position.

Optionally, the communication device further includes a third determination unit configured to determine a time-domain offset value of the first resource within the first period in accordance with the SI signaling, and the time-domain offset value is an offset value of the first resource relative to the target paging frame, or the time-domain offset value is an offset value of the first resource relative to an SSB.

Optionally, the determining the first resource includes determining a resource position of the first resource.

Optionally, the determining the resource position of the first resource includes: obtaining a time-domain parameter of the first resource in accordance with the SI signaling or the PDCCH signaling; and determining the resource position of the first resource in accordance with the predefined rule and the time-domain parameter.

Optionally, the time-domain parameter includes at least one of a time-domain offset value of the first resource, a relevant parameter of the paging period, or a relevant parameter of the paging frame. The predefined rule is used to indicate that the resource position of the first resource is associated with at least one of an identity of the UE, the time-domain offset value of the first resource, the relevant parameter of the paging period or the relevant parameter of the paging frame.

Optionally, the determining the first resource includes: determining a transmission beam of the first resource; or determining the first resource for at least one beam.

Optionally, the determining the transmission beam of the first resource includes: determining the transmission beam of the first resource in accordance with the first resource or a candidate resource; or determining the transmission beam of the first resource in accordance with the SI signaling, the SI signaling being at least used to indicate the transmission beam of the first resource; or determining the transmission beam of the first resource in accordance with a transmission beam for the SI signaling or the PDCCH signaling.

Optionally, the determining the first resource for at least one beam includes determining the first resource for the at least one beam in accordance with the SI signaling, wherein the SI signaling is used to indicate the first resource for the at least one beam.

Optionally, the SI signaling is used to indicate the first resource for the at least one beam through a correspondence between a TCI state of the first resource for the at least one beam and an SSB.

Optionally, the SI signaling includes a bitmap, a bit length of the bitmap matches with the quantity of SSBs, bits in the bitmap are associated with an SSB transmission beam, a position index of a target element in the bitmap is associated with an index of the first resource, an SSB transmission beam associated with the target element is the transmission beam of the corresponding first resource, and a value of the target element is a target value.

Optionally, the determining the first resource for the at least one beam includes determining the first resource for the at least one beam in accordance with the SI signaling, wherein the SI signaling is used to configure a second offset value of the first resource of a first signal for the at least one beam relative to a first offset value, the first offset value is an offset value of a second signal, and the first signal and the second signal are two of a TRS, a CSI-RS, a PEI and an SSB.

Optionally, the determining the first resource includes determining a frequency-domain position of the first resource.

Optionally, the determining the frequency-domain position of the first resource includes determining, in accordance with a pre-agreement between the network side and the UE, that a start frequency-domain position and an end frequency-domain position of the first resource are associated with at least one of an active bandwidth, a CORESET or an initial BWP.

Optionally, the determining the first resource includes: determining the first resource updated through the PDCCH signaling in accordance with the PDCCH signaling; or determining, in accordance with the PDCCH signaling and the predefined rule, the first resource updated through the PDCCH signaling.

Optionally, the determining, in accordance with the PDCCH signaling and the predefined rule, the first resource updated through the PDCCH signaling includes determining that the first resource updated through the PDCCH signaling goes into effect at a target time after the reception of the PDCCH signaling, and the target time is defined in the predefined rule.

Optionally, the determining the first resource includes determining a TCI state of the first resource.

Optionally, the first resource is a first resource set.

Optionally, the TCI state of the first resource is same as a TCI state of a transmitted SSB, or the first resource is associated with the transmitted SSB.

Optionally, an index of the first resource is associated with an identity of the SSB, and the index of the first resource is an index indicated explicitly or implicitly.

Optionally, indices of a plurality of first resources are sequenced in accordance with an order of the corresponding SSBs.

Optionally, the indices of the plurality of first resources are indicated explicitly or implicitly in resource configuration information of the first resource; or the indices of the plurality of first resources are indicated through a bitmap, and the quantity of bits in the bitmap is associated with the transmitted SSB; or the index of each first resource is same as an identity of the associated SSB.

It should be appreciated that, the communication device in the embodiments of the present disclosure may be used to implement all the steps of the above-mentioned method with a same technical effect, which will not be further particularly defined herein.

It should be appreciated that, the units in the embodiments of the present disclosure are for illustrative purposes, and they are provided merely on the basis of their logic functions. The units may be integrated in a processing unit, or physically separated from each other, or two or more units may be integrated in one unit. The integrated units may be implemented in the form of hardware or a software functional unit.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The present disclosure further provides in some embodiments a processor-readable storage medium storing therein a computer program. The computer program is used to be executed by a processor to implement the above-mentioned method.

The processor-readable storage medium may be any available medium or data storage device capable of being accessed by a processor, which includes, but not limited to, a magnetic memory (e.g., floppy disk, hard disk, magnetic tape, or Magnetic Optical disk (MO)), an optical memory (e.g., Compact Disk (CD), Digital Video Disk (DVD), Blue-ray Disk (BD), or High-definition Versatile Disk (HVD)), or a semiconductor memory (e.g., ROM, Electrically Programmable ROM (EPROM), Electrically Erasable PROM (EEPROM), NAND flash, or Solid-State Disk (SSD)).

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

It should be further appreciated that, the above modules are divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, this module may be stored in the memory of the above-mentioned device in the form of a program code, and may be called and executed by a processing element of the above-mentioned device so as to achieve the above functions. The other modules may be implemented in a similar manner. All or parts of the modules may be integrated together or arranged separately. Here, the modules, units or assemblies may each of an Integrated Circuit (IC) having a signal processing capability. During the implementation, the steps of the method or the modules may be implemented through an integrated logic circuit of the processing element in the form of hardware or through instructions in the form of software.

For example, the above modules may be one or more ICs capable of implementing the above-mentioned method, e.g., one or more Application Specific Integrated Circuits (ASICs), one or more Digital Signal Processors (DSPs), or one or more Field Programmable Gate Array (FPGA). For another example, when a certain module is implemented by calling a program code through a processing element, the processing element may be a general-purpose processor, e.g., a Central Processing Unit (CPU) or any other processor capable of calling the program code. These modules may be integrated together and implemented in the form of system-on-a-chip (SOC).

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. In addition, the expression "and/or" in the description and the appended claims is merely used to represent at least one of the objects before and after the expression. For example, "A and/or B and/or C" represents seven situations, i.e., there is only A, there is only B, there is only C, there are both A and B, there are both B and C, thereby are both A and C, and there are A, B and C. Similarly, the phrase "at least one of A and B" in the specification and the appended claims shall be understood as "there is only A, there is only B, or there are both A and B".

Obviously, a person skilled in the art can make various modifications and variations to the present application without departing from the spirit and scope of the application. In this way, if these modifications and variations fall within the scope of the claims of the present application and their equivalent technologies, the present application is also intended to include these modifications and variations.

What is claimed is:

1. A resource determination method, comprising:
determining, by a User Equipment (UE), a transmission resource for a reference signal in accordance with configuration information, wherein the configuration information comprises at least one of:
configuration content obtained by the UE through System Information (SI) signaling; or
configuration content obtained by the UE through Physical Downlink Control Channel (PDCCH) signaling;
wherein the configuration information comprises the configuration content obtained by the UE through the PDCCH signaling, the determining the transmission resource for the reference signal comprises:
determining a transmission resource or transmission resource set of a Channel-State-Information Reference Signal (CSI-RS) based on the PDCCH signaling, wherein a validity duration of the PDCCH signaling is determined by a network side device through a predefined rule;
and/or
the configuration information comprises the configuration content obtained by the UE through the SI signaling, the determining the transmission resource for the reference signal comprises:
determining a Transmission Configuration Indication (TCI) state of a Tracking Reference Signal (TRS)/CSI-RS resource set which is configured by the network side device through the SI signaling, wherein each TRS/CSI-RS resource set is configured with one TCI state, and each TRS/CSI-RS resource set comprises one or more CSI-RS resources.

2. The resource determination method according to claim 1, wherein the determining the transmission resource for the reference signal comprises:
determining a first period of the transmission resource for the reference signal,
wherein the first period is a function of a paging period; or
the first period is a function of the paging period and the quantity of paging frames within the paging period; or
the first period is a function of a Synchronization Signal Block (SSB) period.

3. The resource determination method according to claim 2, wherein in the case that the first period is the function of the paging period, the quantity of transmission resources for the reference signal within the first period corresponds to the quantity of Paging Occasions (POs) of the paging frame.

4. The resource determination method according to claim 3, further comprising:
determining, by the UE, a common time-domain offset value of the transmission resource for the reference signal corresponding to a plurality of POs within a target paging frame in accordance with the SI signaling, or determining, by the UE, at least one time-domain offset value of the transmission resource for the reference signal corresponding to at least one PO within the target paging frame,
wherein the common time-domain offset value is used to determine a resource position of the transmission resource for the reference signal corresponding to the plurality of POs, and the at least one time-domain offset value is used to determine a resource position of the transmission resource for the reference signal corresponding to the at least one PO.

5. The resource determination method according to claim 4, wherein the resource position comprises at least one of: a start position of the transmission resource for the reference signal or an end position of the transmission resource for the reference signal; or the resource position is used to indicate that the start position of the transmission resource for the reference signal is after the resource position or that the end position of the transmission resource for the reference signal is before the resource position.

6. The resource determination method according to claim 1, wherein the determining the transmission resource for the reference signal comprises:

determining a Transmission Configuration Indication (TCI) state of the transmission resource for the reference signal.

7. The resource determination method according to claim 6, wherein the transmission resource for the reference signal is a transmission resource set.

8. The resource determination method according to claim 6, wherein the TCI state of the transmission resource for the reference signal is same as a TCI state of a transmitted Synchronization Signal Block (SSB); or the transmission resource for the reference signal is associated with the transmitted SSB.

9. The resource determination method according to claim 8, wherein an index of the transmission resource for the reference signal is associated with an identity of the SSB, and the index of the transmission resource for the reference signal is an index indicated explicitly or implicitly.

10. The resource determination method according to claim 9, wherein indices of a plurality of transmission resources for the reference signal are sequenced in accordance with an order of the corresponding SSBs.

11. The resource determination method according to claim 10, wherein the indices of the plurality of transmission resources for the reference signal are indicated explicitly or implicitly in resource configuration information of the transmission resource for the reference signal; or the indices of the plurality of transmission resources for the reference signal are indicated through a bitmap, and the quantity of bits in the bitmap is associated with the transmitted SSB; or the index of the transmission resource for the reference signal is same as an identity of the SSB associated with the transmission resource for the reference signal.

12. A UE, comprising a memory, a transceiver and a processor, wherein the memory is configured to store therein a computer program, the transceiver is configured to transmit and receive data under the control of the processor, the processor is configured to read the computer program in the memory to:

determine a transmission resource for a reference signal in accordance with configuration information, wherein the configuration information comprises at least one of:

configuration content obtained by the UE through SI signaling; or configuration content obtained by the UE through PDCCH signaling;

wherein the configuration information comprises the configuration content obtained by the UE through the PDCCH signaling, the determining the transmission resource for the reference signal comprises:

determining a transmission resource or transmission resource set of a CSI-RS based on the PDCCH signaling, wherein a validity duration of the PDCCH signaling is determined by a network side device through a predefined rule;

and/or the configuration information comprises the configuration content obtained by the UE through the SI signaling, the determining the transmission resource for the reference signal comprises:

determining a TCI state of a TRS/CSI-RS resource set which is configured by the network side device through the SI signaling, wherein each TRS/CSI-RS resource set is configured with one TCI state, and each TRS/CSI-RS resource set comprises one or more CSI-RS resources.

13. A resource determination method performed by a network side device, comprising:

determining a transmission resource for a reference signal, and notifying a UE of the transmission resource for the reference signal through configuration information, wherein the configuration information comprises at least one of:

configuration content notified to the UE through SI signaling; or configuration content notified to the UE through PDCCH signaling;

wherein the configuration information comprises the configuration content notified to the UE through the PDCCH signaling, so that the UE determines a transmission resource or transmission resource set of a CSI-RS based on the PDCCH signaling, wherein a validity duration of the PDCCH signaling is determined by the network side device through a predefined rule;

and/or the configuration information comprises the configuration content notified to the UE through the SI signaling, so that the UE determines a TCI state of a TRS/CSI-RS resource set which is configured by the network side device through the SI signaling, wherein each TRS/CSI-RS resource set is configured with one TCI state, and each TRS/CSI-RS resource set comprises one or more CSI-RS resources.

14. The resource determination method according to claim 13, wherein the determining the transmission resource for the reference signal comprises:

determining a TCI state of the transmission resource for the reference signal.

15. The resource determination method according to claim 14, wherein the transmission resource for the reference signal is a transmission resource set.

16. The resource determination method according to claim 14, wherein the TCI state of the transmission resource for the reference signal is same as a TCI state of a transmitted SSB; or the transmission resource for the reference signal is associated with the transmitted SSB.

17. The resource determination method according to claim 16, wherein an index of the transmission resource for the reference signal is associated with an identity of the SSB, and the index of the transmission resource for the reference signal is an index indicated explicitly or implicitly.

18. The resource determination method according to claim 17, wherein indices of a plurality of transmission resources for the reference signal are sequenced in accordance with an order of the corresponding SSBs.

19. The resource determination method according to claim 18, wherein the indices of the plurality of transmission resources for the reference signal are indicated explicitly or implicitly in resource configuration information of the transmission resource for the reference signal; or the indices of the plurality of transmission resources for the reference signal are indicated through a bitmap, and the quantity of bits in the bitmap is associated with the transmitted SSB; or the index of the transmission resource for the reference signal is same as an identity of the SSB associated with the transmission resource for the reference signal.

20. A network side device, comprising a memory, a transceiver and a processor, wherein the memory is configured to store therein a computer program, the transceiver is configured to transmit and receive data under the control of the processor, the processor is configured to read the computer program in the memory to implement the resource determination method according to claim 13.

* * * * *